Aug. 20, 1940.   E. M. FLESH   2,212,489
GUN MOUNT
Filed Dec. 9, 1937   4 Sheets-Sheet 1

INVENTOR
EDWARD M. FLESH.
BY
ATTORNEY

Aug. 20, 1940.　　　E. M. FLESH　　　2,212,489
GUN MOUNT
Filed Dec. 9, 1937　　　4 Sheets-Sheet 2

INVENTOR
EDWARD M. FLESH.
BY
ATTORNEY

Aug. 20, 1940.   E. M. FLESH   2,212,489
GUN MOUNT
Filed Dec. 9, 1937   4 Sheets-Sheet 3

INVENTOR
EDWARD M. FLESH.
BY
ATTORNEY

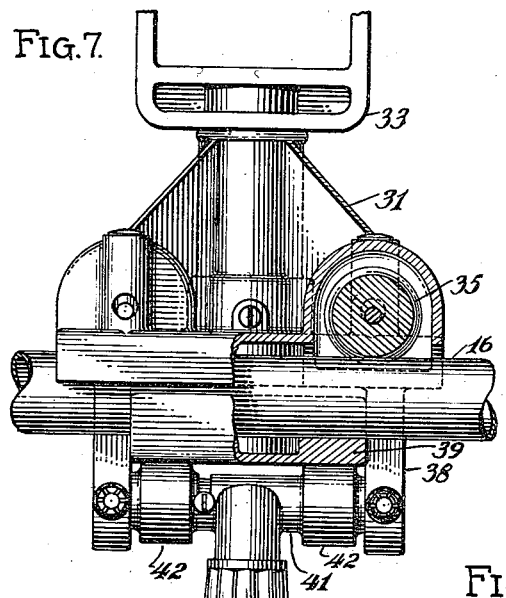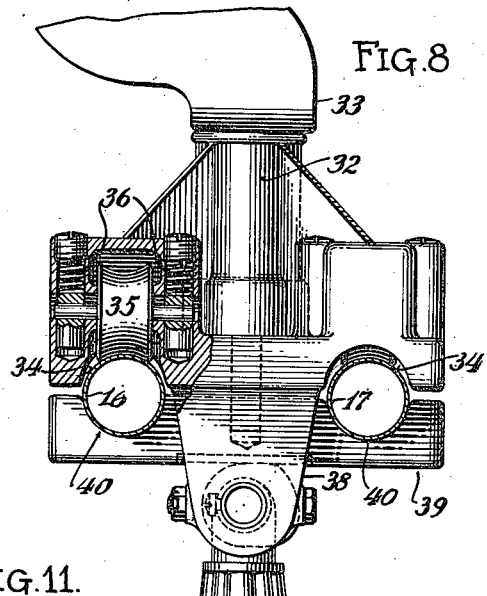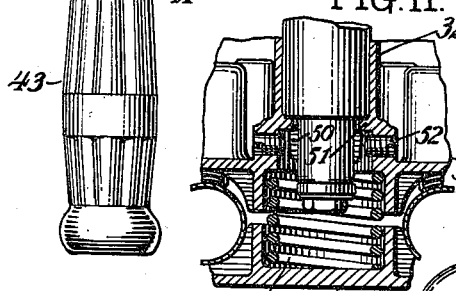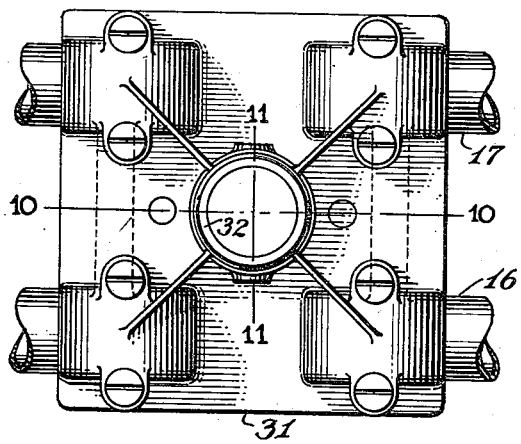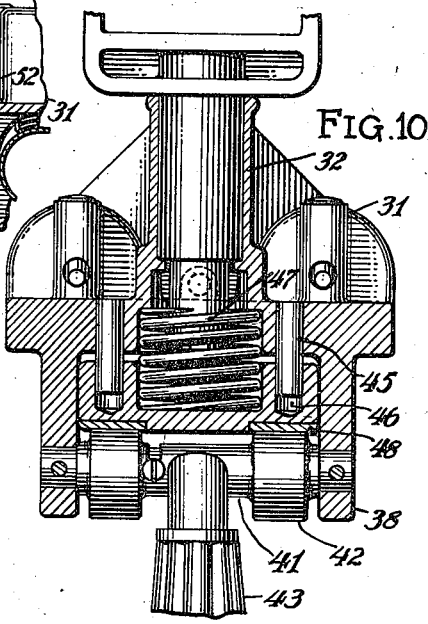

Patented Aug. 20, 1940

2,212,489

UNITED STATES PATENT OFFICE 2,212,489

GUN MOUNT

Edward M. Flesh, Ferguson, Mo., assignor to Curtiss-Wright Corporation, a corporation of Delaware Application December 9, 1937, Serial No. 178,942

1 Claim. (Cl. 89—37.5)

This invention relates to improvements in flexible mounts for machine guns, being particularly adapted for installation in aircraft.

An object of the invention is to provide a gun mount of extreme simplicity, and one which may be fabricated at low cost, while still affording a high degree of flexibility for the mounted gun.

Further objects will be apparent from a reading of the annexed specification and claims, together with an examination of the accompanying drawings, in which Fig. 1 is a fragmentary plan view of an aircraft fuselage equipped with a gun mount;

Fig. 7 is a detail view partly in section of the gun carriage, looking aft;

Fig. 8 is a side elevation of the gun carriage;

Fig. 9 is a plan of the carriage;

Fig. 10 is a section through the carriage, from the same angle of view as Fig. 7; and Fig. 11 is an enlarged detail section of a portion of Fig. 8.

Figure 1:
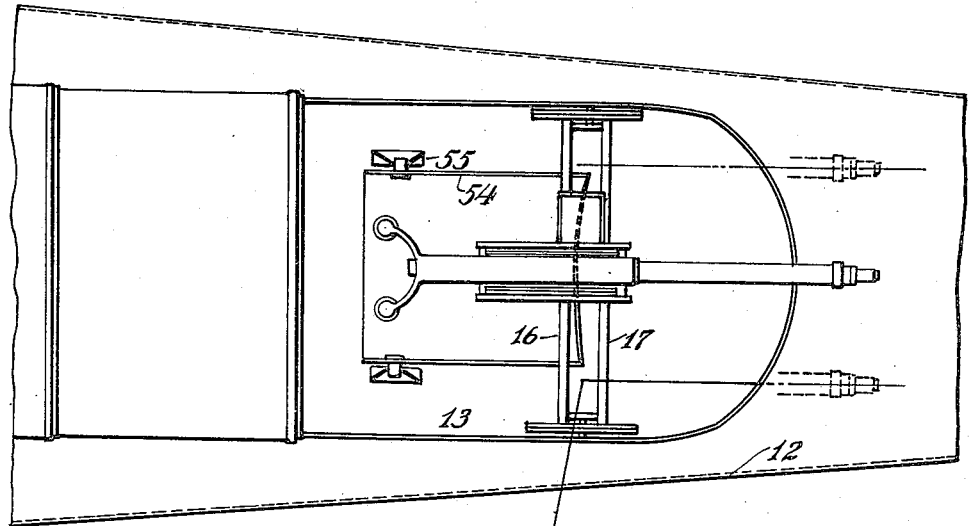

Reference may be made to Figs. 1 to 4, inclusive, wherein an aircraft fuselage 12 is provided with a gunner's cockpit 13 bordered by longitudinal structural elements 14. Attached to the members 14 are substantially semicircular brackets 15, these brackets being opposite one another on opposite sides of the cockpit. The gun mount track comprises parallel tubes 16 and 17 attached at their ends to triangular shaped yokes 18 which are pivoted by means of bolts 19 to respective brackets 15. The lower apex of each yoke 18 is provided with a lock shown in detail in Fig. 6, the lock comprising a bushing 20 within which a plunger 21 is slidable, the left end of the plunger being provided with a pointed externally threaded element 22, and the right end of the plunger being provided with a hand wheel 23. The plunger is normally urged toward the right, as in Fig. 6, by means of a spring 24 bearing at its respective ends on a fixed washer 25 within the bushing 20, and upon the hub of the wheel 23. The brackets 15 are provided with a plurality of internally threaded bushings 26 at positions corresponding to those in which it may be desired to lock the gun mount track.

Figure 2:
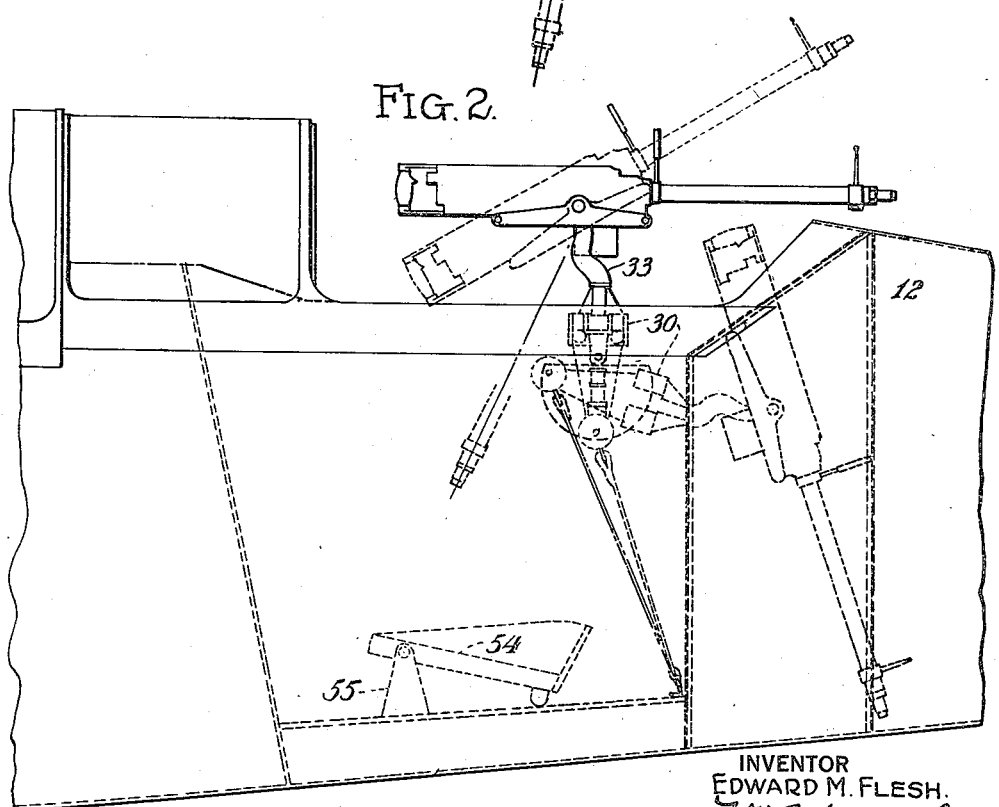
Fig. 2 is a side elevation.
Figure 3:
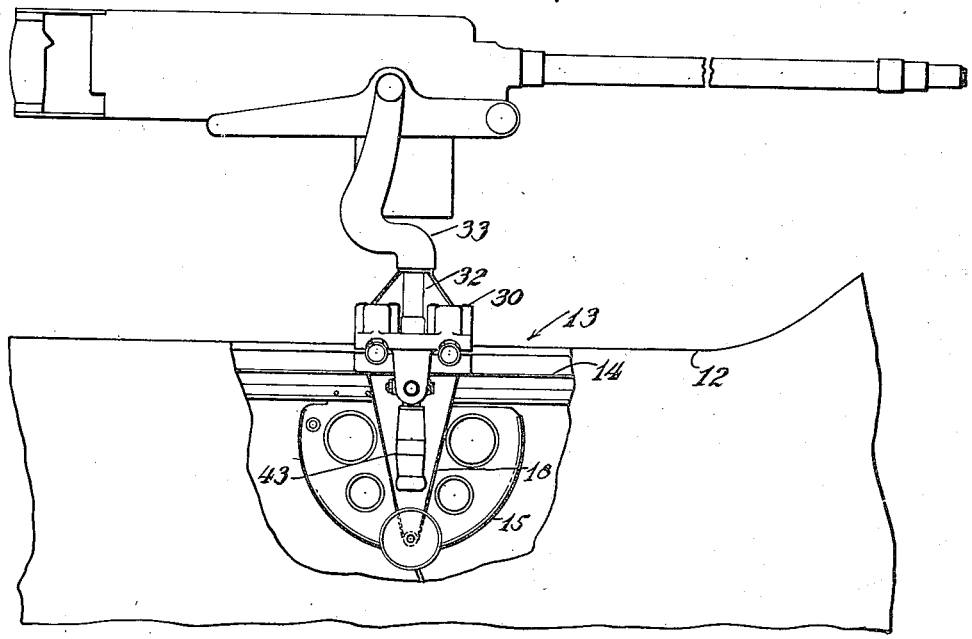
Fig. 3 is an enlarged side elevation, partly broken away to show the gun mount.
Figure 4:
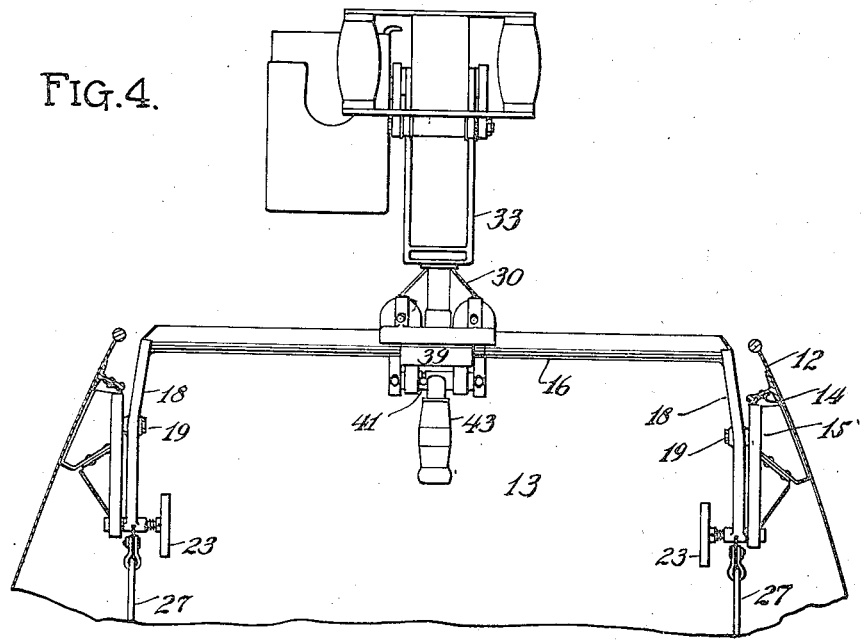
Fig. 4 is a view looking aft in the aircraft cockpit showing the gun mount.
Figure 5:
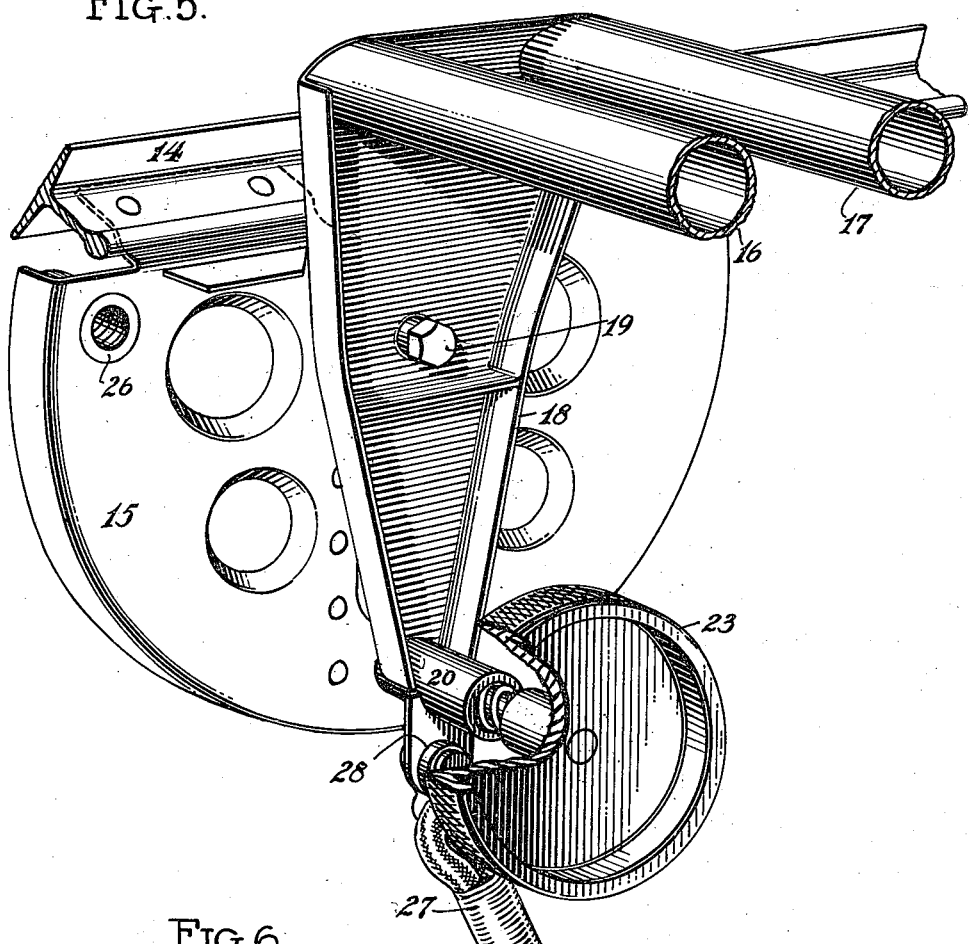
Fig. 5 is an enlarged detail perspective showing part of the gun mount.
Figure 6:
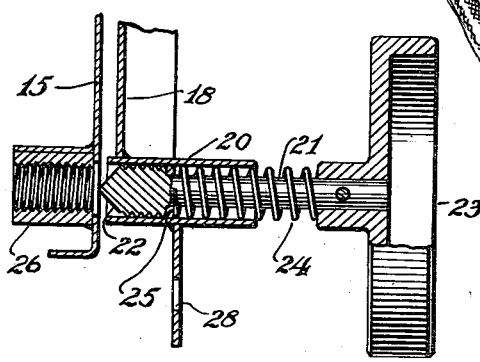
Fig. 6 is an enlarged section through a locking mechanism.

From Figs. 5 and 6 it will be apparent that, when the hand wheels 23 are unscrewed, the yokes 18 may be swung around the bolts 19, and the yoke may be locked in position by pressing in on the hand wheels 23 and screwing same, so that the elements 22 engage the threaded bushings 26. Two sets of bushings 26 are all that are normally needed, one being provided for the battery position of the gun mount, and the other being provided for the stowing position of the gun mount. These positions are shown in Fig. 2, the stowing position being such that the elements 16, 17 and 18 are swung rearwardly to carry the gun under the rearward fuselage deck. To balance the weight of the gun mount assembly when stowed, rubber shock cords 27 are engaged between a suitable eye on the floor of the cockpit, and an eye 28 formed on each yoke 18.

A gun carriage 30 is mounted to slide along the tubes 16 and 17, the carriage comprising an upper half 31 provided with a socket 32 for a gun adapter 33, and with lateral grooves 34 engageable with the tubes 16 and 17. The member 31 is provided with pairs of rollers 35 mounted on spring supports 36, the springs being sufficiently strong to raise the element 31 from direct contact with the tubes 16 and 17, whereby the carriage may be freely traversed along the track. The element 31 is provided with depending ears 38 between which a clamp block 39 is located, said block having grooves 40 fitted to the tubes 16 and 17. A camshaft 41 is journaled in the ears 38, said camshaft having cams 42 and a handle 43 so arranged that when the handle is pulled upwardly and toward the gunner, the cams cause a drawing together of the clamping block 39 and the carriage element 31, depressing the rollers 35 into their recesses against their spring supports to firmly lock the carriage to the tubes 16 and 17. As shown in Fig. 10, guide pins 45 seated in the element 31, engage holes 46 in the clamping block 39 to aline respective elements, and a compression spring 47 bears at its ends upon the element 31 and the clamping block 39 to oppose the clamping effect of the cams 42, serving to immediately release the guncarriage for free traverse on the track when the handle 43 is in an unlocked position. Wear plates 48 are attached to the block 39 upon which the cams 42 are adapted to bear.

The gun adapter 33 is held within its socket 32 by means of pawls 50 engaging a shoulder 51 in the socket, and setscrews 52 are let through the sides of the socket which may be screwed in to press the pawls inwardly when it is desired to remove the adapter from its socket.

As shown in Figs. 1 and 2, the gun on its carriage may be moved from side to side on the track to enable the gunner to point a mounted gun laterally and downwardly over either side of the fuselage, the lateral movement of the carriage also permitting practically universal aiming of the gun in a spherical quadrant extending above and laterally of the aircraft fuselage.

In the normal installation, a folding seat 54 is supported on brackets 55 on the floor of the cockpit, this seat providing accommodations for the gunner when the gun is inactive. The seat may be tipped forwardly upon the brackets, to a suitable position, for use during gun operation.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In a flexible gun mount, spaced parallel tubes comprising a track, a carriage element engageable with said tubes, rollers bearing upon said tubes and journaled in said carriage including resilient means between said rollers and carriage for normally holding the carriage out of engagement with the tubes, clamping means for overcoming said resilient means and effecting engagement of the carriage with the tubes, said clamping means comprising a block movable with the carriage, and a cam-operated device for urging said block and carriage toward one another for clamping the block and carriage to the tubes.

EDWARD M. FLESH.